United States Patent
Shiota et al.

(10) Patent No.: US 7,088,058 B2
(45) Date of Patent: Aug. 8, 2006

(54) IMAGE DISPLAY

(75) Inventors: Tetsuro Shiota, Takatsuki (JP); Satoshi Hamada, Ibaraki (JP); Toshiyuki Noguchi, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/520,334

(22) PCT Filed: Jun. 1, 2004

(86) PCT No.: PCT/JP2004/007891

§ 371 (c)(1),
(2), (4) Date: Jan. 5, 2005

(87) PCT Pub. No.: WO2005/009035

PCT Pub. Date: Jan. 27, 2005

(65) Prior Publication Data
US 2005/0242741 A1    Nov. 3, 2005

(30) Foreign Application Priority Data
Jul. 18, 2003    (JP) .............................. 2003-199253

(51) Int. Cl.
*G05F 1/00* (2006.01)
*H05B 37/02* (2006.01)

(52) U.S. Cl. ...................... 315/291; 315/224; 315/112; 353/101

(58) Field of Classification Search ........ 315/112–118, 315/169.4, 291, 224; 353/31, 69, 101, 94
See application file for complete search history.

(56) References Cited

U.S. PATENT DOCUMENTS

| 6,597,118 | B1 * | 7/2003 | Arimoto et al. ............. 315/115 |
| 6,630,796 | B1 * | 10/2003 | Tokunaga et al. ......... 315/169.4 |
| 6,891,338 | B1 * | 5/2005 | Kubo .......................... 315/291 |
| 2002/0140905 | A1 * | 10/2002 | Ouchi et al. ................. 353/31 |
| 2003/0179346 | A1 * | 9/2003 | Mihara ......................... 353/31 |
| 2003/0223049 | A1 * | 12/2003 | Ohara ......................... 353/101 |
| 2004/0212787 | A1 * | 10/2004 | Kida et al. ................... 353/94 |
| 2004/0251855 | A1 * | 12/2004 | Belliveau ................... 315/291 |
| 2005/0195372 | A1 * | 9/2005 | Ohara .......................... 353/69 |
| 2005/0213045 | A1 * | 9/2005 | Taoka et al. .................. 353/31 |

FOREIGN PATENT DOCUMENTS

| JP | 05-127608 | 5/1993 |
| JP | 06-160811 | 6/1994 |
| JP | 2002-033978 A | 1/2002 |
| JP | 2003-005147 A | 1/2003 |

* cited by examiner

OTHER PUBLICATIONS

International Search Report for PCT/JP2004/007891, dated Sep. 7, 2004.

*Primary Examiner*—Trinh Dinh
*Assistant Examiner*—Tung Le
(74) *Attorney, Agent, or Firm*—RatnerPrestia

(57) ABSTRACT

An image display device which has a display element that optically modulates an incident light for displaying an image. A lamp is a light source of the incident light to the display element. A lamp driver drives the lamp. A lamp power level calculator calculates a driving power level of the lamp corresponding to a level of an input video signal. A lamp temperature controller controls a lamp temperature depending on changes in the input signal from the lamp power level calculator so as to change the lamp temperature within a predetermined range in response to fluctuations of the input video signal. This image display device can further include a projection lens for projecting and displaying images formed in the display element on a screen.

14 Claims, 11 Drawing Sheets

IMAGE DISPLAY

THIS APPLICATION IS A U.S. NATIONAL PHASE APPLICATION OF PCT INTERNATIONAL APPLICATION PCT/JP2004/007891.

TECHNICAL FIELD

The present invention relates to image display devices for displaying high-contrast video images.

BACKGROUND ART

Projection-type display devices and direct-viewing liquid crystal display devices are popular image display devices employing a display element that spatially modulates light emitted from a light source (lamp) for displaying video images by means of either transmissive or reflective optical modulation.

FIG. 20 shows a configuration of an example of a projection-type display device employing a transmissive liquid crystal panel.

Each component in FIG. 20 works as described below.

Lamp 105 illuminates liquid crystal panel 115 as a light source. Projection lens 116 magnifies and projects a video image displayed on liquid crystal panel 116 onto screen 117. Cooling fan 108 for controlling the lamp temperature cools down lamp 105 when it gets too hot.

Lamp driver 104 drives lamp 105. Fan control signal generator 107 drives cooling fan 108 for controlling the lamp temperature.

Liquid crystal panel driver 114 converts and processes video signals into signals required for driving liquid crystal panel 115, and displays images on liquid crystal panel 115.

The above components except for screen 117 are included in projector 118 (projection-type display device).

In a projection television (PTV), screen 117 is placed inside the display device, and images are projected from the back of the screen. In the case of a direct viewing liquid crystal display device, projection lens 116 and screen 117 are excluded from the above configuration, and the user looks at images directly on the liquid crystal panel.

Compared to an image display device employing a self-luminescent display element such as a CRT, black rise tends to occur more in dark portions in image display devices employing a display element for optical modulation such as liquid crystal panels.

One proposed method for suppressing this black rise and improving the contrast of displayed images is to dynamically change the lighting luminance of the lamp to match the input video images. For example, the Japanese Laid-open Application Nos. H5-127608 and H6-160811 disclose this method.

The Japanese Laid-open Application No. H5-127608 proposes the following method.

The characteristic of an input video signal is detected from the maximum and minimum values of the input video signal. When the mean of the maximum and minimum values is higher than a predetermined threshold, the luminance of the lamp is reduced to maintain the luminance of the displayed image within a certain range.

The Japanese Laid-open Application No. H6-160811 proposes the next method.

The maximum value of the input video signal is detected. If the maximum value is higher than a predetermined threshold, the luminance of the lamp is increased. If the maximum value is lower than the predetermined threshold, the lamp luminance is decreased. In addition, the amplitude of the video luminance signal when the maximum value is low is reduced compared to the amplitude of the video luminance signal when the maximum value is high. This enhances the relative contrast of images between the high and low maximum values.

As described above, when the luminance of the lamp, the light source, is dynamically controlled in accordance with the video signal, scenes with low or high lamp driving level are considered to continue for a long period in some input video sources.

If this state occurs with a discharge type light source such as high-pressure mercury lamp or xenon lamp, the lamp bulb temperature increases or decreases out of the reliability-assured range.

This causes so-called blackening or whitening by shading of the lamp bulb due to attachment of foreign particles or degradation of the lamp, resulting in reduced reliability of the lamp.

DISCLOSURE OF INVENTION

An image display device of the present invention employs a display element that optically modulates the incident light for displaying images. A lamp is a light source of the incident light to the display element. A lamp driver drives the lamp. A lamp power level calculator calculates the driving power level of the lamp corresponding to the level of the input video signal. A lamp temperature controller controls the lamp temperature depending on changes in input signal from the lamp power level calculator so as to change the lamp temperature within a predetermined range in response to fluctuations of the input video signals.

The image display device of the present invention can further include a projection lens for projecting and displaying images formed in the display element on a screen.

DETAILED DESCRIPTION OF PREFERRED EMBODIMENTS

First Exemplary Embodiment

Figure 1:
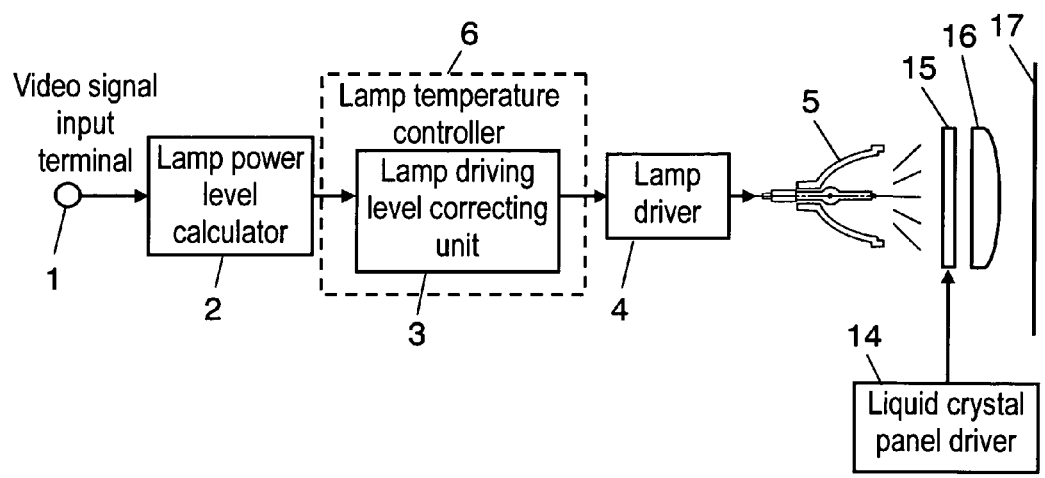
FIG. 1 is a block diagram of an image display device in accordance with a first exemplary embodiment.
Figure 2:
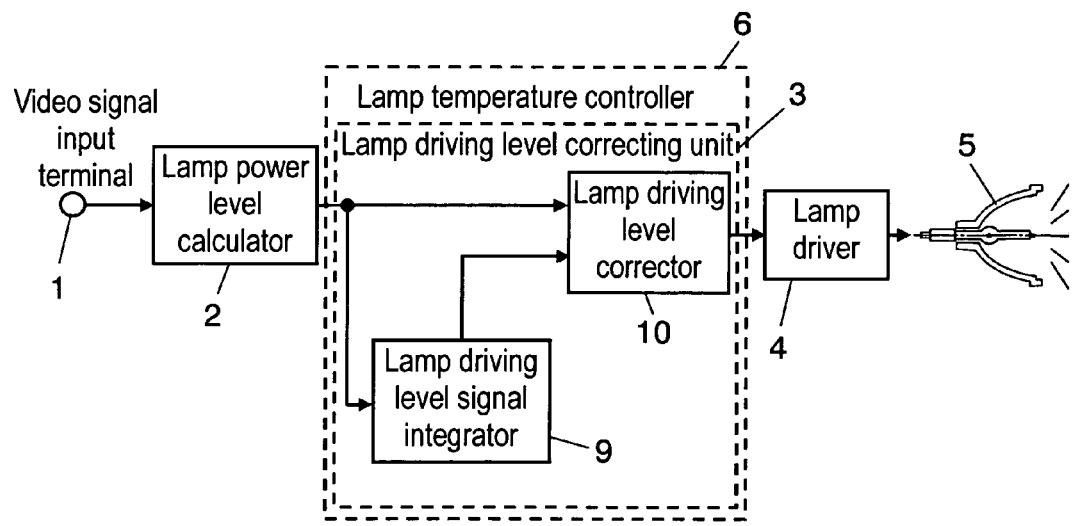
FIG. 2 is a block diagram of the image display device in accordance with the first exemplary embodiment.

FIGS. 1 and 2 are block diagrams illustrating configurations of an image display device in an exemplary embodiment of the present invention.

FIGS. 10 to 13 illustrate the concept of the present invention.

In FIG. 1, lamp 5 is a light source for illuminating liquid crystal panel 15. Projection lens 16 magnifies and projects the image displayed on liquid crystal panel 15. The image is projected on screen 17.

Liquid crystal panel driver 14 converts and processes the video signal into a signal required for driving liquid crystal panel 15, and displays the image on liquid crystal panel 15.

The image display device of the present invention can also be a direct-viewing liquid crystal display device in which the user directly looks at the image displayed on liquid crystal panel 15.

In FIG. 2, lamp driving level signal integrator 9 and lamp driving level corrector 10 configure lamp driving level correcting unit 3.

The input video signal is input from video signal input terminal 1 to lamp power level calculator 2. The output signal from lamp power level calculator 2 is input to lamp driving level signal integrator 9. A signal integrated in lamp driving level signal integrator 9 and the output signal of lamp power level calculator 2 are input to lamp driving level corrector 10. The lamp driving level signal from lamp driving level corrector 10 is input to lamp driver 4. The output signal of lamp driver 4 drives lamp 5.

In this exemplary embodiment, lamp temperature controller 6 is composed of lamp driving level correcting unit 3.

The operation is described next in sequence from the input.

Lamp power level calculator 2 calculates the lamp driving power level corresponding to the input video signal. For example, the maximum value of the luminance signal related to brightness of the input image is calculated.

The operation of lamp power level calculator 2 is described next with reference to an example of correlation between the input video luminance signal and lamp driving power shown in FIG. 10.

When the maximum value of the luminance signal per field is 100% of the input dynamic range, the maximum (MAX) lamp driving power is assigned. When the maximum value is 0% of the input dynamic range, the minimum (MIN) lamp driving power is assigned.

When the luminance signal for gradation whose maximum value per field is between 100% and 0% of the input dynamic range is input, the lamp driving power is interpolated to a value between the maximum and minimum.

Accordingly, the lamp driving power is increased to display a bright image when the level of input video signal is high for a bright scene. When a scene is judged to be dark, based on a low input signal level, the lamp power is decreased to display a dark image. This improves the contrast of the displayed images that the user notices when watching the images.

Only the maximum value of the luminance level of the video signal is used in this exemplary embodiment for extracting the characteristic of the input video signal. However, the characteristic of the input video signal can also be determined based on the input RGB signal. The color signal information can also be included in the determination. Moreover, minimum value, mean value and distribution information such as the histogram of the video signal such as luminance signal can also be used.

The lamp driving power level corresponding to the input video signal obtained as above is input to lamp driving level correcting unit 3.

Next, the operation of lamp driving level correcting unit 3 configuring lamp temperature controller 6 in this exemplary embodiment is described with reference to FIG. 2.

First, the operation of lamp driving level signal integrator 9 in lamp driving level correcting unit 3 is described.

Figure 11:
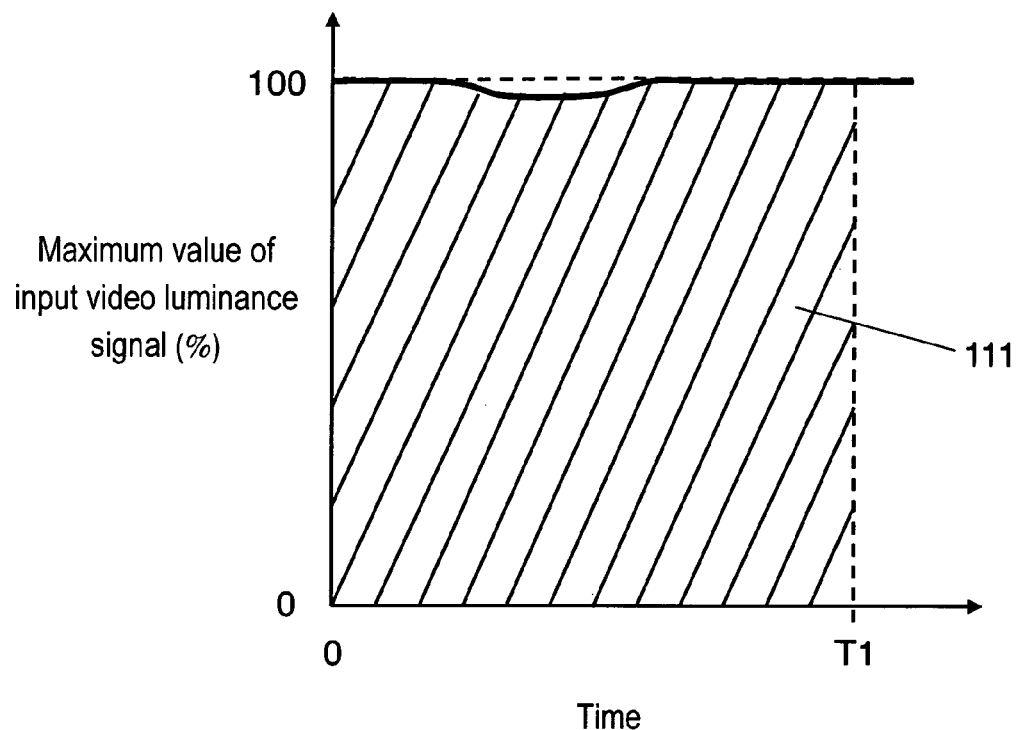
FIG. 11 illustrates the operation of a lamp driving level signal integrator.

FIG. 11 shows the change of the maximum value of the input video luminance signal versus time, which becomes the basis of the lamp driving level, between a predetermined reference time and time T1, a branch point of operation.

Shaded portion 111 in this Figure is the integrated value obtained by time integration of the maximum value of the input video luminance signal between time 0 and TR1. This integrated value indicates the total lamp driving power in time T1.

Lamp driving level signal integrator 9 calculates the area of this shaded portion 111. At every T1, lamp driving level signal integrator 9 is reset, and the integrated value is re-calculated. Time T1 is optimized depending on the lamp used. This integrated value 111 of the lamp driving power level at every fixed time T1 and the output signal from aforementioned lamp power level calculator 2 are input to lamp driving level corrector 10. The output signal from lamp driving level corrector 10 is input to lamp driver 4. The output signal from lamp driver 4 drives lamp 5.

Next, the operation of lamp driving level corrector 10 in lamp driving level correcting unit 3 is described with reference to FIGS. 12 and 13.

Figure 12:
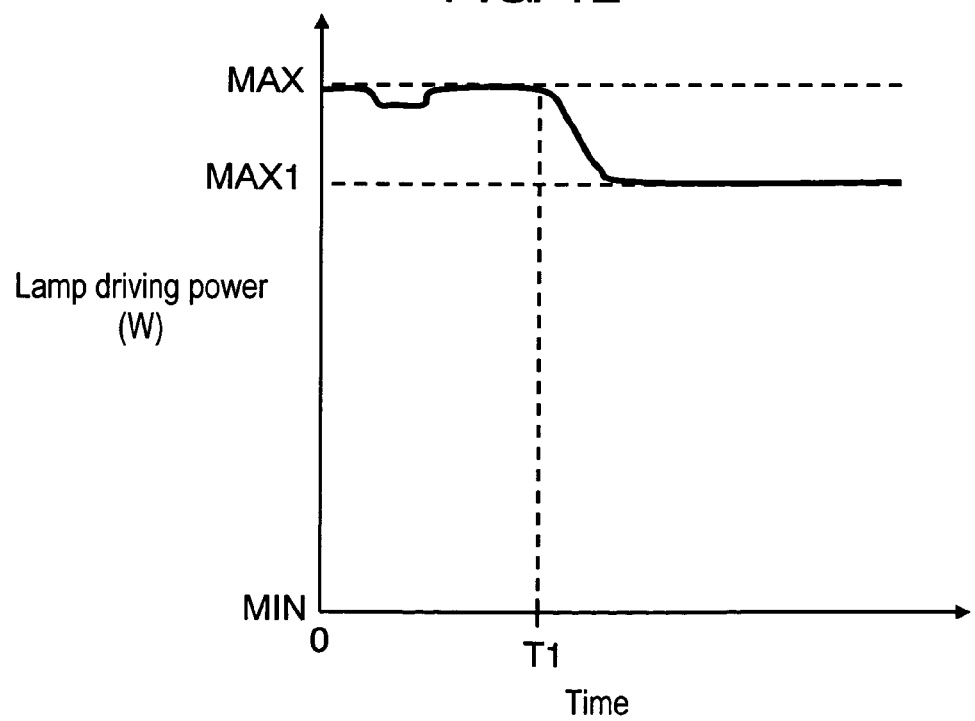
FIG. 12 illustrates an operation of a lamp driving level corrector.

Changes in the lamp driving power versus time up to time T1 in FIG. 12 correspond to changes in the maximum value of the input video luminance signal up to T1 in FIG. 11.

When lamp driving level corrector 10 determines that the driving power level is higher than a predetermined threshold based on information input on integrated value of the lamp driving power level up to fixed time T1, lamp driving level corrector 10 reduces the lamp driving power until lamp 5 reaches the temperature at which reliability of lamp 5 is assurable.

In the example shown in FIG. 12, the lamp driving power is reduced from MAX to MAX1. In this case, transition of the driving power from MAX to MAX1 is preferably slow to the extent of preventing a sense of incongruity on the display screen. The temperature of lamp 5 can thus be reduced to where the reliability of lamp 5 is assurable by decreasing the lamp driving power level itself when the high lamp driving power level continues.

When the lamp driving power stays low, the temperature of lamp 5 is considered to fall too low.

Figure 13:
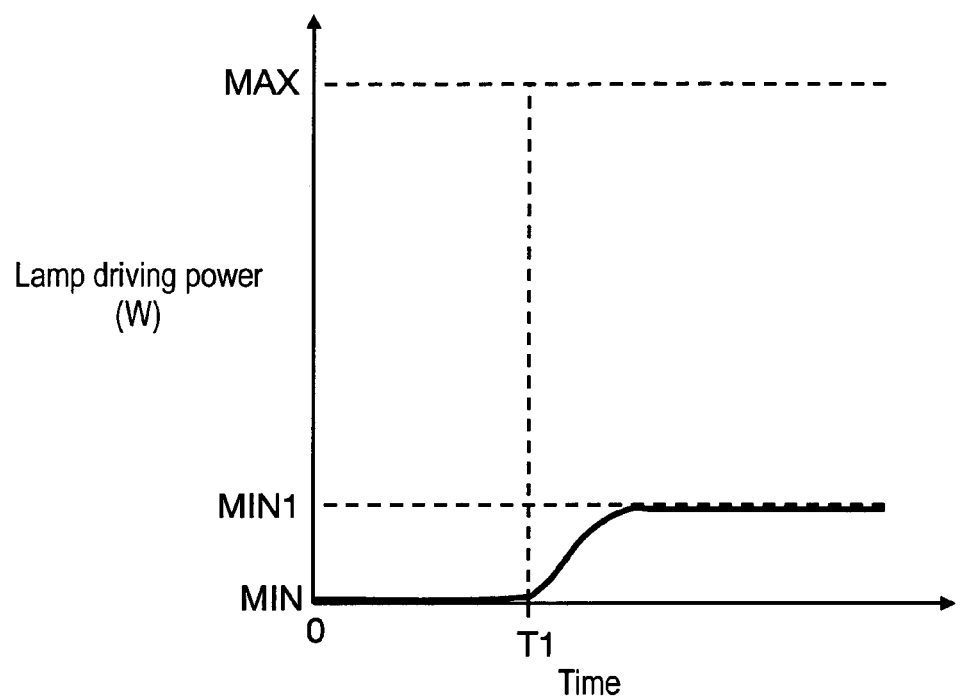
FIG. 13 is another figure illustrating an operation of the lamp driving level corrector.

In this case, as shown in FIG. 13, when the output of lamp driving level signal integrator 9 is smaller than the predetermined threshold, lamp driving level corrector 10 determines that the lamp driving power level up to time T1 is low. Lamp driving level corrector 10 then increases the lamp driving power until lamp 5 rises to the temperature at which reliability of lamp 5 is assurable.

In an example shown in FIG. 13, lamp driving level corrector 10 increases the lamp driving power from MIN to MIN1. The temperature of lamp 5 can thus be increased to where the reliability of lamp 5 is assurable by increasing the lamp driving power level itself when low lamp driving power continues.

As described above, the lamp temperature is controlled in response to fluctuations of the input video signal and the lamp temperature is adjusted only within a predetermined range.

The level for driving the lamp is calculated based on the maximum, minimum and mean values and distribution information, such as histogram, of the input video signal.

The continuity of the low power driving level or high power driving level is detected respectively from the information on integrated value that is obtained by time integration of the lamp driving level over a fixed time. The lamp driving level is then shifted respectively to a higher power driving level or a lower power driving level. This prevents temperature drop or rise of the lamp bulb, and contributes to ensuring the reliability of the lamp, such as the life of lamp and preservation of the lamp luminance.

In this exemplary embodiment, the output of lamp power level calculator 2 is used for obtaining information on the lamp driving power level over a fixed period. It is apparent that the video signal input from video signal input terminal 1 can also be used for this purpose.

Second Exemplary Embodiment

Figure 3:
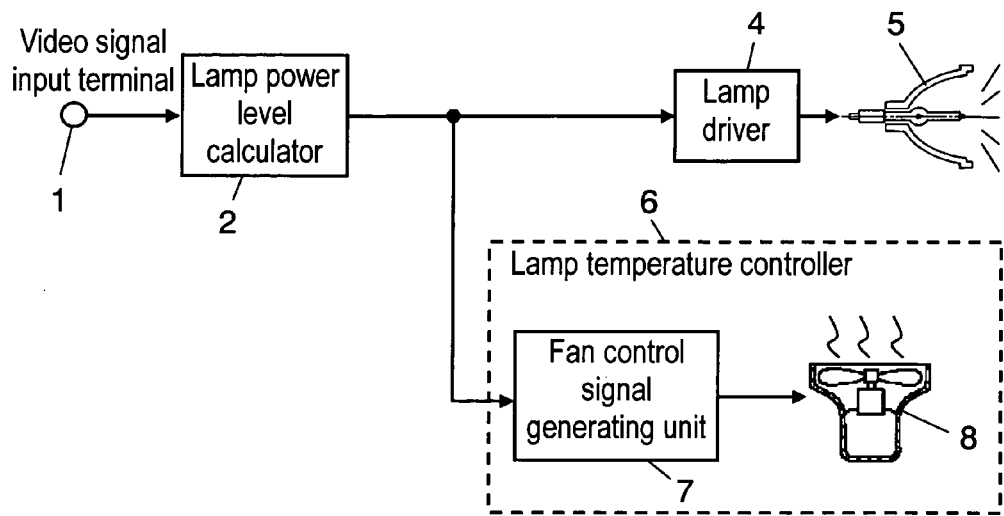
FIG. 3 is a block diagram of an image display device in accordance with a second exemplary embodiment.
Figure 4:
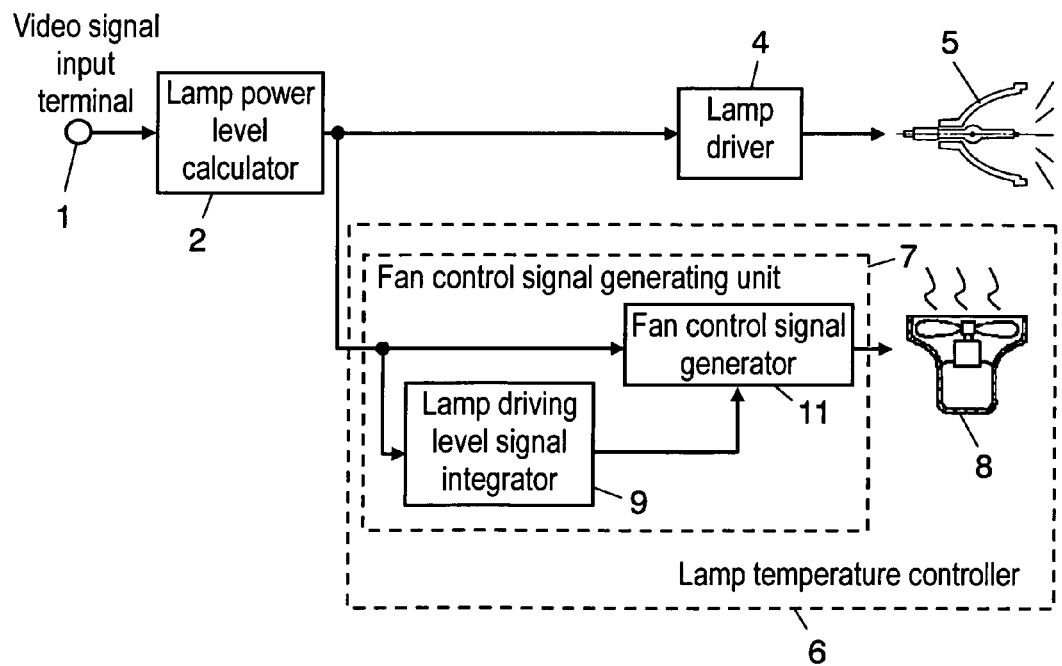
FIG. 4 is a block diagram of the image display device in accordance with the second exemplary embodiment.

FIGS. 3 and 4 are block diagrams illustrating the configuration of an image display device in the second exemplary embodiment of the present invention.

FIGS. 10, 11, 14 and 15 describe the concept of the present invention.

The same reference numerals are given to the same components as those in FIGS. 1 and 2 for the first exemplary embodiment of the present invention, and these components operate in the same way.

In the second exemplary embodiment, lamp temperature control fan 8 cools down lamp 5. Fan control signal generating unit 7 drives lamp temperature control fan 8.

Liquid crystal panel 15, projection lens 16, screen 17 and liquid crystal panel driver 14 shown in FIG. 1 are omitted here.

An input video signal from video signal input terminal 1 is input to lamp power level calculator 2. The output signal of lamp power level calculator 2 is input to lamp driver 4 and fan control signal generating unit 7.

Information obtained by integral calculation using lamp driving level signal integrator 9 and the output signal of lamp power level calculator 2 are input to fan control signal generator 11. The output signal of fan control signal generator 11 is input to lamp temperature control fan 8 for controlling the operation of control fan 8. In this way, the lamp temperature is controlled.

The output signal of lamp power level calculator 2 described above is input to lamp driver 4. Lamp driver 4 drives lamp 5.

In the second exemplary embodiment, the lamp temperature controller 6 includes fan control signal generating unit 7 and lamp temperature control fan 8.

The operation is described next in sequence from the input.

The input video signal from video signal input terminal 1 is input to lamp power level calculator 2. Lamp power level calculator 2 calculates lamp driving power level corresponding to the input video signal.

Figure 10:
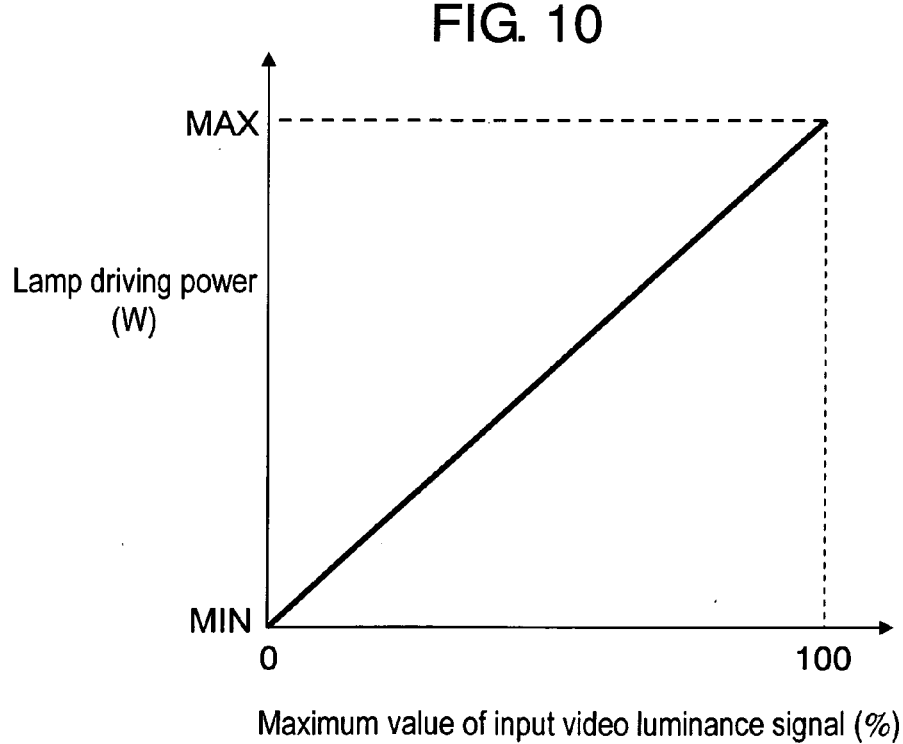
FIG. 10 illustrates correlation between an input video signal and lamp driving power.

Lamp power level calculator 2 operates in a way as described previously using correlation between the input video luminance signal and lamp driving power shown in FIG. 10.

In this exemplary embodiment, only the maximum value of the luminance level of the video signal is used for extracting the characteristic of the input video signal. However, the characteristic of the input video signal can be determined based on the input RGB signal. The color signal information can also be included in the determination. Moreover, the minimum value, mean value and distribution information of the luminance signal can be used.

The lamp driving power level corresponding to the input video signal obtained as above is input to fan control signal generating unit 7.

Next, the operation of fan control signal generating unit 7 is described using an example in FIG. 4.

Fan control signal generating unit 7 includes lamp driving level signal integrator 9 and fan control signal generator 11.

The operation of lamp driving level signal integrator 9 in fan control signal generating unit 7 is the same as that in the first exemplary embodiment.

FIG. 11 shows the change of the maximum value of the input video luminance signal versus time, which becomes the basis of the lamp driving level, between a predetermined reference time and time T1, a branch point of operation. Accordingly, shaded portion 111 is the integrated value obtained by time integration of the maximum value of the input video luminance signal between time 0 and T1. This integrated value indicates the total lamp driving power in time T1.

The integrated value of the lamp driving power level at every fixed time T1, the output from lamp driving level signal integrator 9; and the output signal from lamp power level calculator 2 are input to fan control signal generator 11. The output signal from fan control signal generator 11 is input to lamp temperature control fan 8, and the operation of lamp temperature control fan 8 is controlled. In this way, the lamp temperature is controlled.

On the other hand, the output signal of aforementioned lamp power level calculator 2 is input to lamp driver 4. Lamp driver 4 drives lamp 5.

The operation of fan control signal generator 11 is described with reference to FIGS. 14 and 15.

Figure 14:
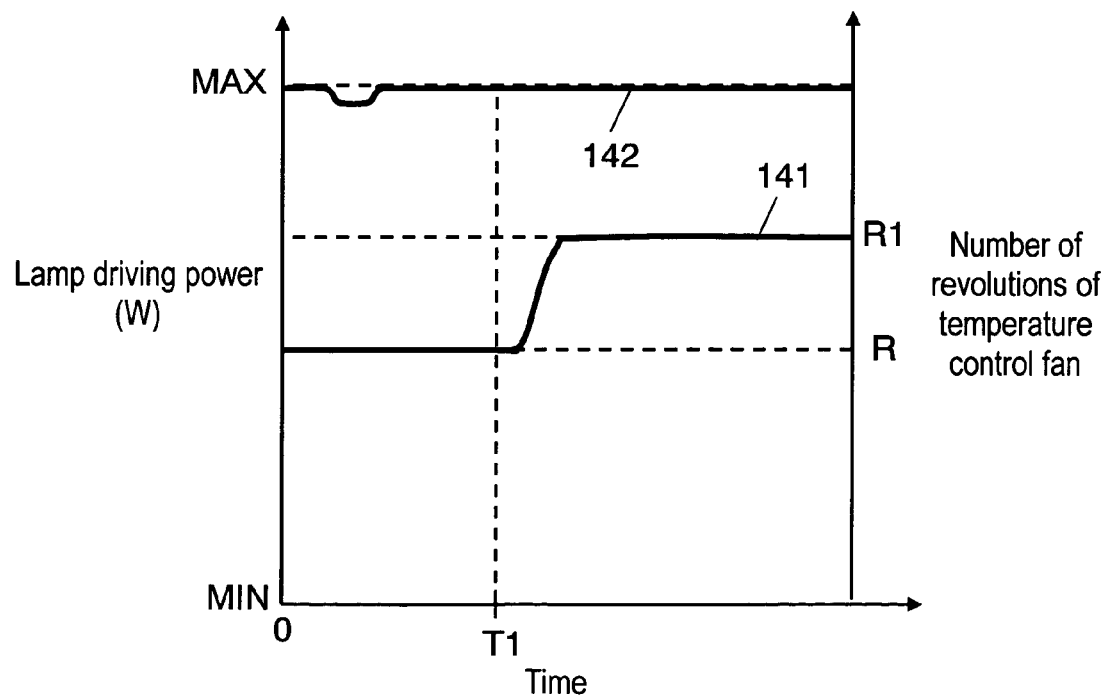
FIG. 14 illustrates fan revolution control.

In FIG. 14, line 142 shows the time transition of the lamp driving power. Changes in the lamp driving power versus time up to time T1 in FIG. 14 correspond to changes in the maximum value of the input video luminance signal up to T1 in FIG. 11.

Line 141 indicates changes in the number of revolutions of the temperature control fan versus time.

When fan control signal generator 11 determines that the driving power level indicated by line 142 is higher than a predetermined threshold based on information input on integrated value of the lamp driving power level up to fixed time T1, fan control signal generator 11 increases the number of revolutions of the fan as shown by line 141 until lamp 5 reaches the temperature at which reliability of lamp 5 is assurable.

In the example shown in FIG. 14, fan control signal generator 11 increases the number of revolutions of the fan from R to R1. In this case, it is preferable that transition of fan revolutions from R to R1 is made in slow speed to the extent that the change cannot be noticed as noise. The temperature of lamp 5 can thus be reduced to where the reliability of lamp 5 is assurable by increasing the number of revolutions of the cooling fan when the high lamp driving power level continues.

Figure 15:
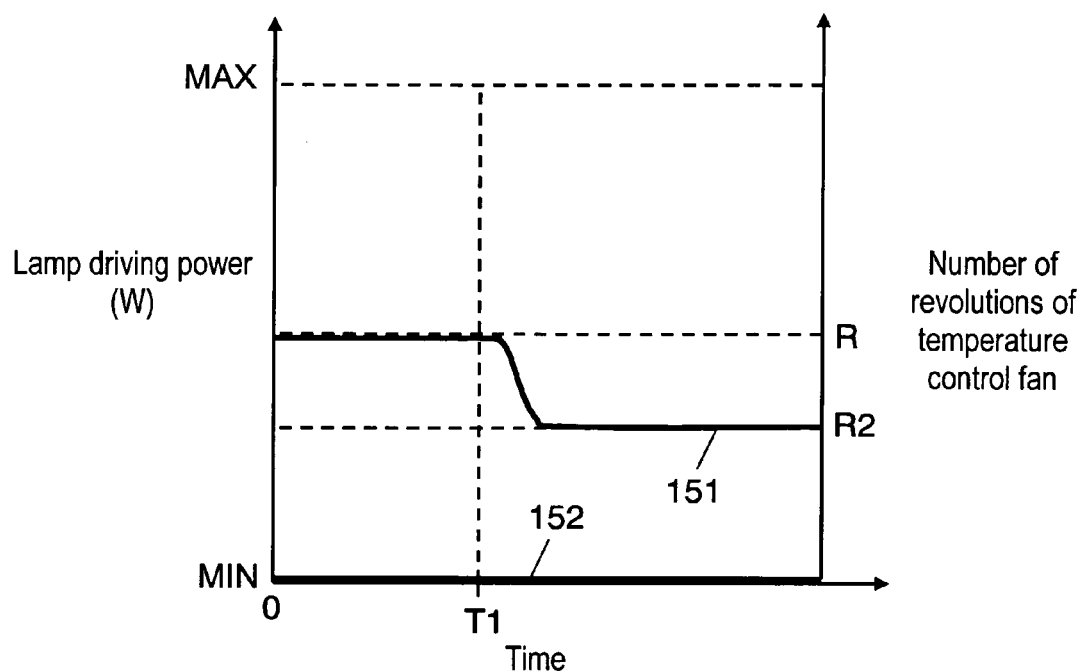
FIG. 15 illustrates fan revolution control.

In FIG. 15, line 152 indicates the change in the lamp driving power versus time. Changes in the lamp driving power versus time up to time T1 in FIG. 15 correspond to changes in the maximum value of the input video luminance signal up to T1 in FIG. 11.

Line 151 indicates changes in the number of revolutions of the temperature control fan versus time.

When the lamp driving power stays continuously low, the temperature of lamp 5 is considered to drop excessively. As shown in FIG. 15, when fan control signal generator 11 determines that the lamp driving power level up to fixed time T1 is low, based on the fact that the output of lamp driving level signal integrator 9 indicated by line 152 is below a predetermined threshold, fan control signal generator 11 reduces the number of revolutions of the cooling fan until the temperature of lamp 5 reaches the temperature at which reliability of lamp 5 is assurable. In the example in FIG. 15, the number of revolutions of the fan indicated by line 151 is reduced from R to R2.

As described above, fan control signal generator 11 reduces the number of revolutions of the cooling fan when low lamp driving power continues. The temperature of lamp 5 can thus be increased to where the reliability of lamp 5 is assurable.

In this exemplary embodiment, the output of lamp power level calculator 2 is used for obtaining information on the lamp driving power level over a fixed period. It is apparent that video signal input from video signal input terminal 1 can also be used for this purpose.

Third Exemplary Embodiment

Figure 5:
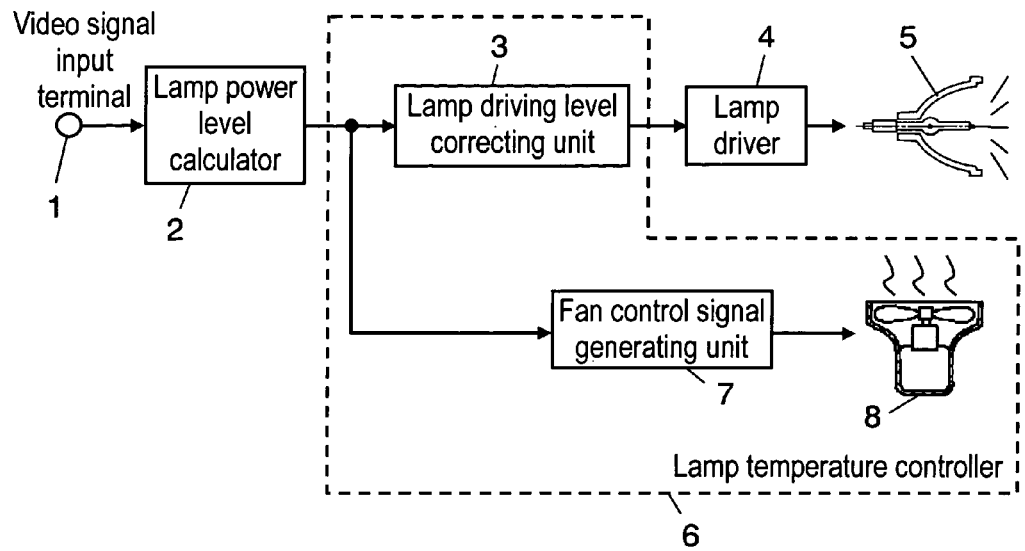
FIG. 5 is a block diagram of an image display device in accordance with a third exemplary embodiment.
Figure 6:
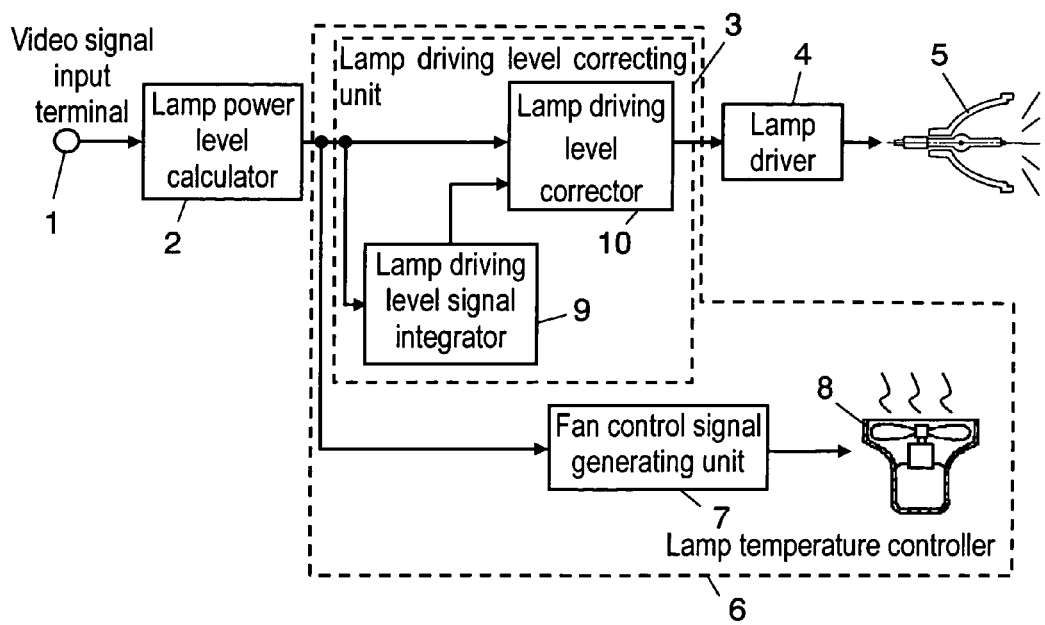
FIG. 6 is a block diagram of the image display device in accordance with the third exemplary embodiment.
Figure 7:
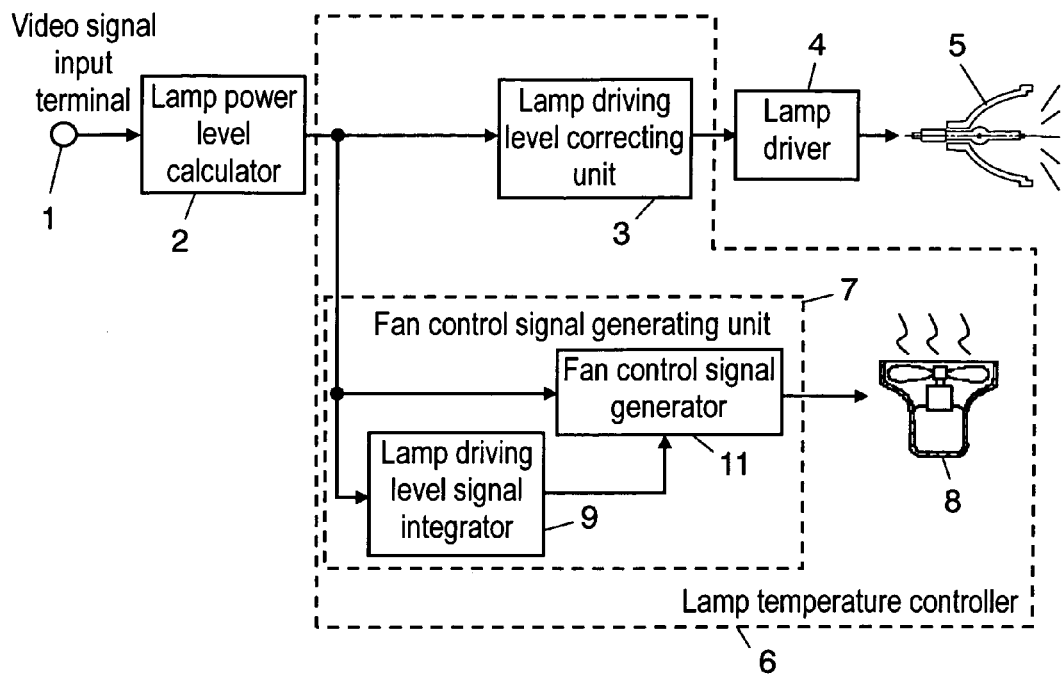
FIG. 7 is a block diagram of the image display device in accordance with the third exemplary embodiment.

FIGS. 5 to 7 show block diagrams illustrating the configuration of an image display device in the third exemplary embodiment.

The same reference numerals are given to the same components as those in FIGS. 1 to 4 for the first and second exemplary embodiments of the present invention, and these components operate in the same way.

In FIG. 5, liquid crystal panel 15, projection lens 16, screen 17 and liquid crystal panel driver 14 shown in FIG. 1 are omitted.

The input video signal from video signal input terminal 1 is input to lamp power level calculator 2. Lamp power level calculator 2 calculates the lamp driving level in accordance with the input video signal. Details of the operation of lamp power level calculator 2 are the same as those in the first and second exemplary embodiments. Lamp temperature controller 6 includes lamp power level correcting unit 3, fan control signal generating unit 7 and lamp temperature control fan 8.

As shown in FIG. 6, lamp driving level correcting unit 3 includes lamp driving level signal integrator 9 and lamp driving level corrector 10.

Lamp power level calculator 2 operates in a way as described previously using correlation between the input video luminance signal and lamp driving power shown in FIG. 10.

Only the maximum value of the luminance level of the video signal is used in this exemplary embodiment for extracting the characteristic of the input video signal. However, the characteristic of the input video signal can also be determined based on the input RGB signal. The color signal information can also be included in the determination. Moreover, minimum value, mean value and distribution information of the luminance signal can also be used.

The lamp driving power level corresponding to the input video signal obtained in the way above is input to lamp driving level correcting unit 3.

The operation of lamp driving level correcting unit 3 and fan control signal generating unit 7 is described with reference to the examples in FIGS. 6 and 7.

The operation of lamp driving level correcting unit 3 and lamp driving level signal integrator 9 in fan control signal generating unit 7 is the same as those in the first and second exemplary embodiments.

As described previously, FIG. 11 shows the change of the maximum value of the input video luminance signal versus time, which becomes the basis of the lamp driving level, between a predetermined reference time and time T1, a branch point of operation. Accordingly, shaded portion 111 is the integrated value obtained by time integration of the maximum value of the input video luminance signal between time 0 and T1. This integrated value indicates the total lamp driving power in time T1.

The integrated value of the lamp driving power level at every fixed time T1 which is the output from lamp driving level signal integrator 9 is output to lamp driving level corrector 10 and fan control signal generator 11.

Figure 16:
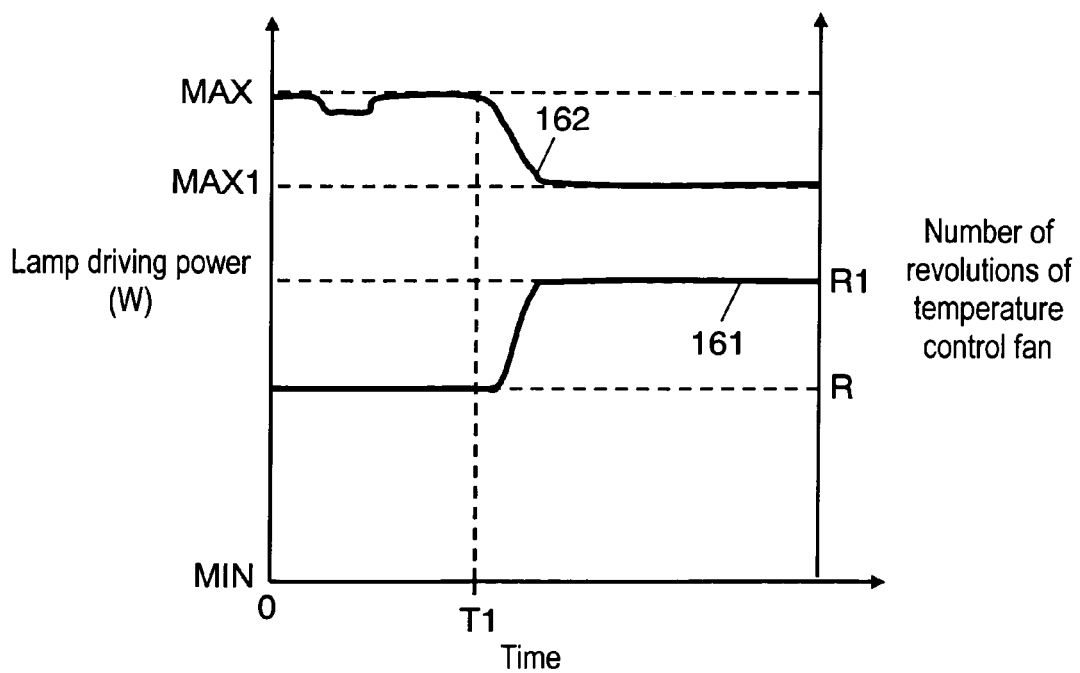
FIG. 16 illustrates lamp driving level correction and fan revolutions number control.

FIG. 16 shows changes in the lamp driving power versus time. Changes in the lamp driving power versus time up to time T1 in FIG. 16 correspond to changes in the maximum value of input video luminance signal up to T1 in FIG. 11.

Line 161 indicates the change in the number of revolutions of the temperature control fan versus time.

When it is determined that the driving power level is higher than a predetermined threshold based on information input on integrated value of the lamp driving power level up to fixed time T1, lamp driving level correcting unit 3 reduces the lamp driving power in a way shown by line 162 until lamp 5 reaches the temperature at which reliability of lamp 5 is assurable. At the same time, fan control signal generating unit 7 increases the number of revolutions of the temperature control fan in a way shown by line 161.

In the example shown in FIG. 16, the lamp driving power is reduced from MAX to MAX1, and the number of revolutions of the temperature control fan is increased from R to R1. The temperature of lamp 5 can thus be reduced to where the reliability of lamp 5 is assurable by decreasing the lamp driving power level itself and increasing the number of revolutions of the fan when the high lamp driving power level continues.

When the lamp driving power stays low, the temperature of lamp 5 is considered to fall too low.

Figure 17:
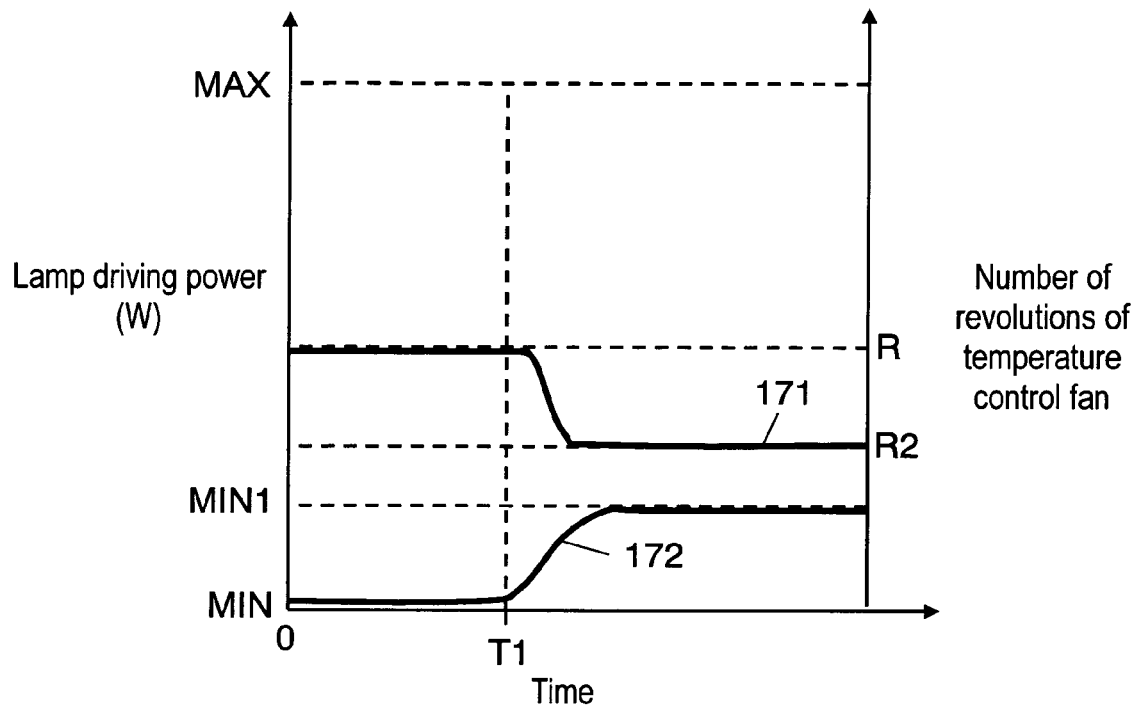
FIG. 17 illustrates lamp driving level correction and fan revolutions number control.

In this case, as shown in FIG. 17, when the output of lamp driving level signal integrator 9 shown by line 172 is smaller than the predetermined threshold and the lamp driving power level up to fixed time T1 is small, lamp driving level correcting unit 3 increases the lamp driving power in a way shown by line 172 until lamp 5 rises to the temperature at which its reliability is assurable. At the same time, the number of revolutions of the temperature control fan is reduced in a way shown by line 171.

In FIG. 17, the lamp driving power is increased from MIN to MIN1, and fan control signal generating unit 7 decreases the number of revolutions of the temperature control fan from R to R2. The temperature of lamp 5 can thus be increased to where the reliability of lamp 5 is assurable by increasing the lamp driving power level itself and decreasing the number of revolutions of the fan when the low lamp driving power level continues.

In this exemplary embodiment, the output of lamp power level calculator 2 is used for obtaining information on the lamp driving power level over a fixed period. It is apparent that the video signal input from video signal input terminal 1 can also be used for this purpose.

Fourth Exemplary Embodiment

Figure 8:
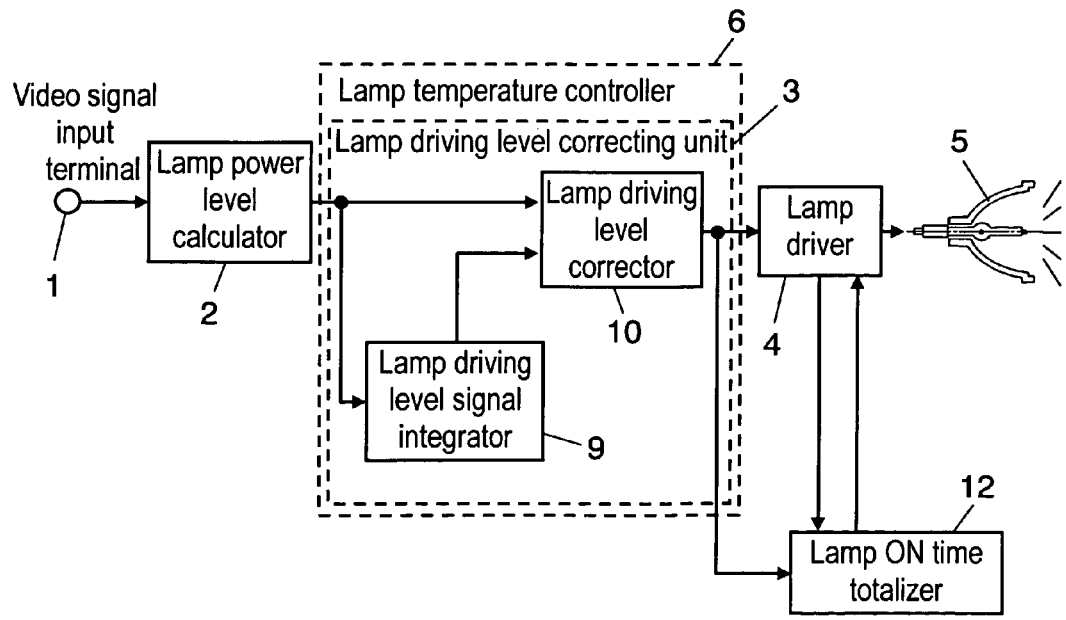
FIG. 8 is a block diagram of an image display device in accordance with a fourth exemplary embodiment.

FIG. 8 is a block diagram illustrating the configuration of an image display device in the fourth exemplary embodiment.

The same reference numerals are given to the same components as those in FIGS. 1 to 7 for the first to third exemplary embodiments, and these components operate in the same way.

In FIG. 8, liquid crystal panel 15, projection lens 16, screen 17 and liquid crystal panel driver 14 in FIG. 1 and lamp temperature control fan 8 and fan control signal generating unit 7 in FIGS. 3 to 7 are omitted.

Lamp 5 is driven in accordance with the input video signal level. In addition, the output signal whose lamp driving level is corrected is output from lamp driving level correcting unit 3, which is lamp temperature controller 6, so as to maintain the temperature of lamp 5 in a range where its reliability is assurable when a low power driving state or high power driving state continues. This output signal is input to lamp driver 4, and lamp driver 4 drives lamp 5. At the same time, the output of lamp driving level corrector 10 is input to lamp ON time totalizer 12. A signal for notifying whether the lamp is turned on or off is also input from lamp driver 4 to lamp ON time totalizer 12. Lamp ON time totalizer 12 measures and totals the time that the lamp ON signal from lamp driver 4 is effective, and uses it as reference data for the lamp use time.

In the exemplary embodiment, as shown in FIG. 8, the correction coefficient is determined in accordance with the lamp driving power level, and practical high-precision lamp use time is calculated by multiplying the use time by the correction coefficient. As a general rule, the correction coefficient is 1 or below during low power driving periods, and the coefficient is 1 or above during high power driving periods. This coefficient is optimized depending on the type of lamp used.

Figure 18:
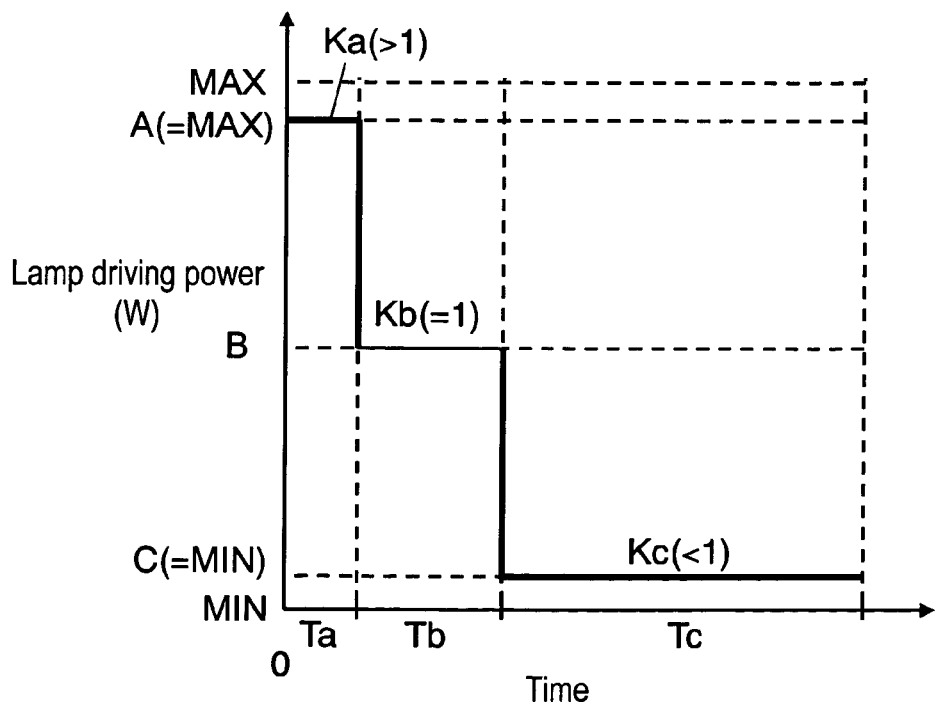
FIG. 18 illustrates accumulated lamp ON time correction.

In FIG. 18, ON time T' after correction and accumulated ON time T before correction are represented by the following equation:

$$T' = Ka \cdot Ta + Kb \cdot Tb + Kc \cdot Tc; \text{ and}$$

$$T = Ta + Tb + Tc,$$

whereas time at around maximum driving power "A", around average driving power "B" and around minimum driving power "C" are respectively Ta, Tb and Tc; and correction coefficient Ka, Kb and Kc are Ka>1, Kb=1 and Kc<1.

If low power driving time occupies most of the time, as in FIG. 18, T'<T. In this case, accumulated ON time after correction is sufficiently small compared to the accumulated ON time before correction. Accordingly, correction allows more practical calculation of a high-precision ON time for the lamp.

Accurate measurement of lamp accumulated ON time allows estimation of the change in luminance versus time in line with the lamp accumulated ON time, and thus accurate lamp power supply corresponding to a change in luminance is enabled. This in turn extends the service life of the lamp.

In addition, in recent years, the lamp is prevented from turning on when the lamp reaches its specified service life time, determined based on the lamp accumulated ON time measured, in equipment using a lamp as a light source, such as projectors. This ensures that the user replaces the lamp. The present invention is effective for improving the accuracy of this kind of measurement.

Fifth Exemplary Embodiment

Figure 9:
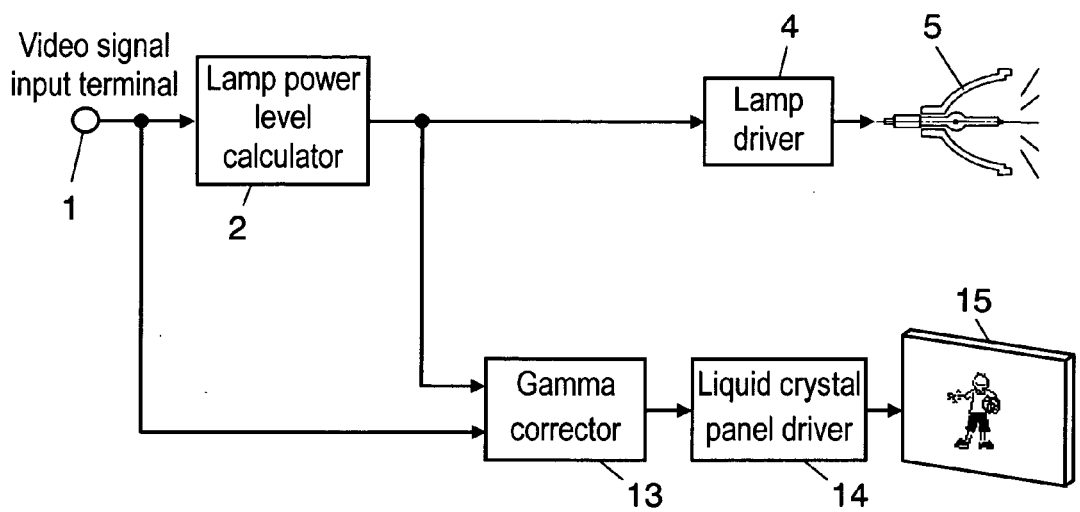
FIG. 9 is a block diagram of an image display device in accordance with a fifth exemplary embodiment.

FIG. 9 is a block diagram illustrating the configuration of an image display device in the fifth exemplary embodiment.

The same reference numerals are given to the same components as those in FIGS. 1 to 8 for the first to fourth exemplary embodiments of the present invention, and these components operate in the same way.

Liquid crystal panel 15 and liquid crystal panel driver 14 are given the same reference numerals as the liquid crystal panel and liquid crystal panel driver described in FIG. 1. Projection lens 16 and screen 17 in FIG. 1, and lamp temperature control fan 8 and fan control signal generating unit 7 shown in FIGS. 3 to 7 are omitted.

The input video signal from video signal input terminal 1 is input to lamp power level calculator 2. Lamp power level calculator 2 calculates the lamp driving power level in accordance with the input video signal.

As described previously, the lamp power level calculator calculates the lamp driving power level corresponding to the input video signal from an example of the correlation between the input video luminance signal and lamp driving power shown in FIG. 10.

The lamp driving power level corresponding to the input video signal obtained in this way is input to lamp driver 4. Lamp driver 4 drives the lamp in the same way as that in the first exemplary embodiment. Lamp driver 4 drives lamp 5 by its output. The light emitted using lamp 5 as a light source is spatially modulated on liquid crystal panel 15, which is a display element having transmissive or reflective optical modulation, and an image is displayed.

At this point, the driving power level of lamp 5 changes in accordance with the input video signal. The characteristic of liquid crystal panel 15 changes according to its energy, and thus the gamma curve of liquid crystal panel 15 changes. This is considered to make the displayed image different from the original image.

To prevent this from happening, the output from lamp power level calculator 2 and video signal input terminal 1 is input to gamma corrector 13. Gamma corrector 13 changes the gamma curve in line with the lamp driving level.

Accordingly, gamma corrector 13 corrects the gamma of the input video signal in accordance with the lamp driving level, and outputs the video signal whose gamma is corrected. Liquid crystal panel driver 14 displays an image based on the video signal after the gamma is corrected on liquid crystal panel 15.

Accordingly, variations in the gamma characteristic due to changes in lamp luminance are corrected. This makes grayscale expression on the liquid crystal display stable independent of lamp luminance.

Variations in gamma characteristic due to lamp luminance are thus corrected, and an image based on the input video signal is displayed.

Figure 19:
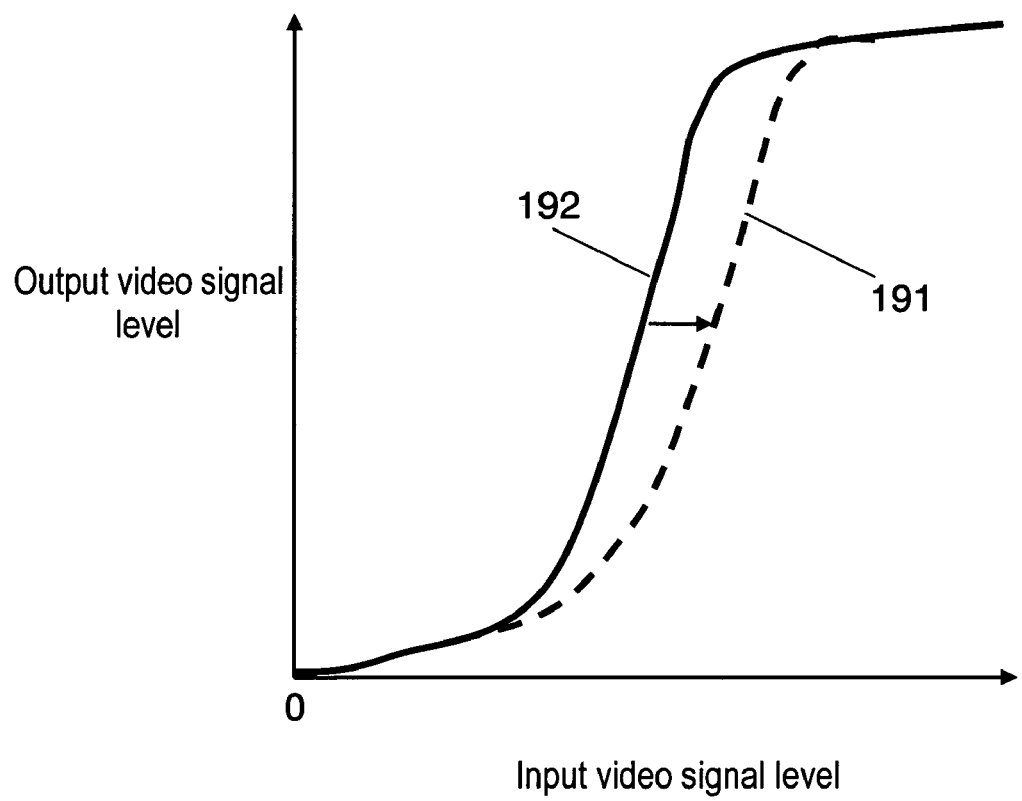
FIG. 19 illustrates gamma correction in accordance with a lamp driving level.
Figure 20:
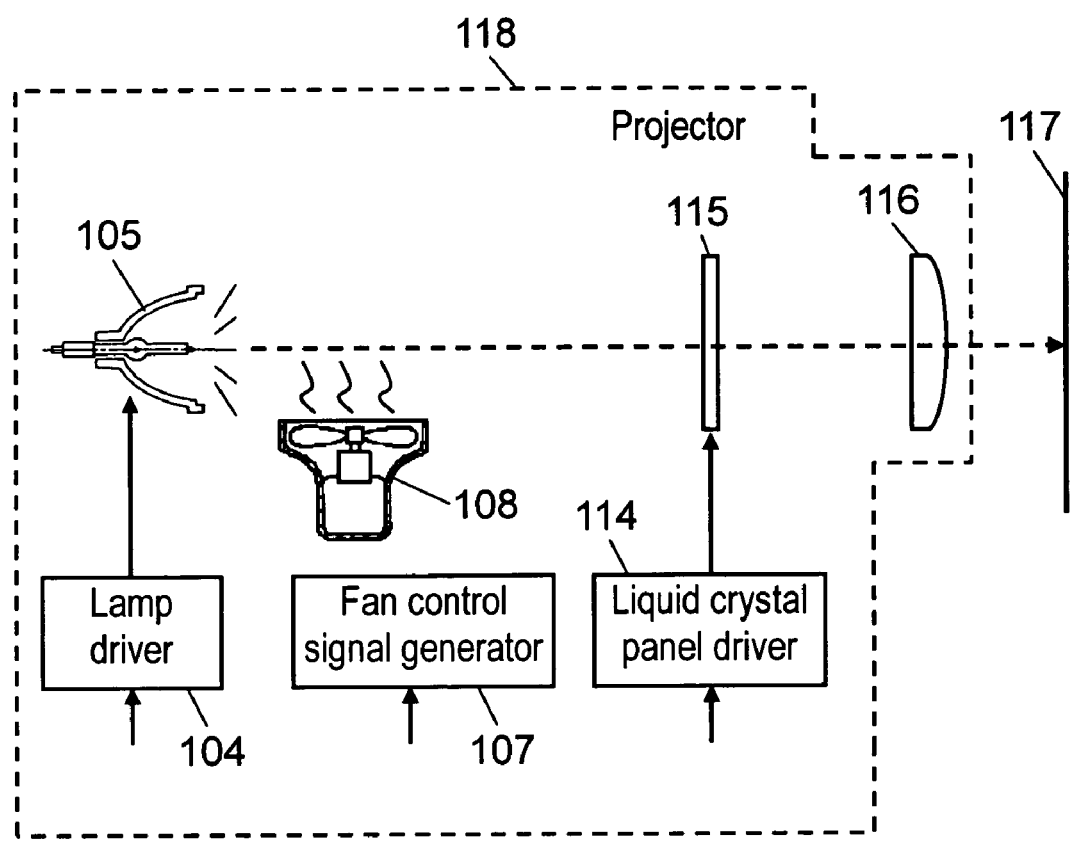
FIG. 20 illustrates configuration of an example of a conventional projection-type image display device employing a transmissive liquid crystal panel.

FIG. 19 shows gamma curve 192 when the lamp is driven at a low power level and gamma curve 191 when the lamp is driven at a high power level. In this way, the gamma curve changes in line with the driving power level of the lamp.

Here, gamma corrector 13 can switch the gamma curve, based on a look-up table, to the degree required in accordance with the lamp driving power level. The look-up table stores the gamma curve for each lamp driving power level.

Alternatively, gamma corrector 13 can create a gamma curve by storing typical gamma curves and compensating only for required steps. Here, the gamma curve is optimized in line with the characteristic of the liquid crystal panel used.

The present invention describes an example of lamp luminance modulation for changing lamp luminance immediately corresponding to the video signal. The present invention is also applicable to fixed high power driving mode and fixed low power driving mode for the lamp.

The above description centers on projection display devices. However, it is apparent that the present invention is applicable to other types of display devices employing screens, such as projection TVs (PTVs), in which the image is projected from the back of the screen; direct-viewing display devices in which the user directly sees the liquid crystal panel; display devices using the lamp as a light source; and lighting units using the lamp as a light source.

INDUSTRIAL APPLICABILITY

In display devices employing a transmissive or reflective display element in which the lamp luminance is modulated in response to the input video signal, the present invention maintains the temperature of the lamp bulb, which fluctuates in accordance with the video signal, within a range over which the reliability is assurable. This improves the contrast of the image display devices, prevents shortening of the service life of the lamp and prevents reduction of lamp luminance. Moreover, the image display device of the present invention displays high-contrast images by controlling lamp luminance and video luminance.

The invention claimed is:

1. An image display device comprising:
a display element which optically modulates an incident light for displaying a video image;
a lamp which is a light source of the incident light to the display element;
a lamp driver for driving the lamp;
a lamp power level calculator for calculating and outputting a driving power level of the lamp in accordance with a level of an input video signal; and
a lamp temperature controller for controlling a temperature of the lamp depending on a change in an input signal from the lamp power level calculator so as to change a temperature of the lamp within a predetermined range in response to fluctuation of the input video signal,
wherein the output driving power level of the lamp varies as a monotonically increasing function of a dynamic range of the input video signal.

2. The image display device as defined in claim 1, wherein the lamp temperature controller is a lamp driving level correcting unit for correcting a lamp driving level in response to fluctuation of the input video signal; and the lamp driving level correcting unit comprises:
a lamp driving level signal integrator for applying time integration to an input from the lamp power level calculator; and
a lamp driving level corrector for correcting an input signal from the lamp power level calculator using an input signal from the driving level signal integrator.

3. The image display device as defined in claim 1, wherein the lamp temperature controller comprises:
a fan control signal generating unit for controlling a number of revolutions of a fan for temperature control in accordance with an input from the lamp power level calculator,
a lamp temperature control fan controlled by an input signal from the fan control signal generating unit; and
the temperature of the lamp is changed within a predetermined range by controlling the number of revolutions of the fan in response to fluctuation of the input video signal.

4. The image display device as defined in claim 3, wherein the fan control signal generating unit comprises:
a lamp driving level signal integrator for applying time integration to an input signal from the lamp power level calculator; and
a fan control signal generator for controlling the number of revolutions of the fan in accordance with an input signal from the lamp power level calculator and an input signal from the lamp driving level signal integrator.

5. The image display device as defined in claim 1, wherein the lamp temperature controller comprises:
a lamp driving level correcting unit for correcting a lamp driving level in response to fluctuation of the input video signal;
a fan control signal generating unit for controlling a number of revolutions of a fan for temperature control in accordance with an input signal from the lamp power level calculator;
a lamp temperature control fan controlled by an input from the fan control signal generating unit; and
the lamp driving level is corrected in response to fluctuation of the input video signal, and the number of revolutions of the fan is controlled in response to fluctuation of the input video signal so as to change a temperature of the lamp within a predetermined range.

6. The image display device as defined in claim 5, wherein the lamp driving level correcting unit comprises:
a lamp driving level signal integrator for applying time integration to an input signal from the lamp power level calculator; and
a lamp driving level corrector for correcting an input signal from the lamp power level calculator using an input signal from the driving level signal integrator.

7. The image display device as defined in claim 5, wherein the fan control signal generating unit comprises:
a lamp driving level signal integrator for applying time integration to an input from the lamp power level calculator; and
a fan control signal generator for controlling the number of revolutions of the fan in accordance with an input signal from the lamp power level calculator and an input signal from the driving level signal integrator.

8. The image display device as defined in claim 1 further comprising a projection lens for projecting and displaying an image formed in the display element on a screen.

9. The image display device as defined in claim 2 further comprising a projection lens for projecting and displaying an image formed in the display element on a screen.

10. The image display device as defined in claim 3 further comprising a projection lens for projecting and displaying an image formed in the display element on a screen.

11. The image display device as defined in claim 4 further comprising a projection lens for projecting and displaying an image formed in the display element on a screen.

12. The image display device as defined in claim 5 further comprising a projection lens for projecting and displaying an image formed in the display element on a screen.

13. The image display device as defined in claim 6 further comprising a projection lens for projecting and displaying an image formed in the display element on a screen.

14. The image display device as defined in claim 7 further comprising a projection lens for projecting and displaying an image formed in the display element on a screen.

* * * * *